United States Patent

Feigel et al.

[11] Patent Number: 5,836,659
[45] Date of Patent: Nov. 17, 1998

[54] ELELCTRONICALLY CONTROLLABLE BRAKE ACTUATION SYSTEM

[75] Inventors: Hans-Jorg Feigel, Rosbach; Ulrich Neumann, RoBdorf; Andreas Klein, Bad Homburg; Lothar Schiel, Hofheim, all of Germany

[73] Assignee: ITT Manufacturing Enterprises Inc., Wilmington, Del.

[21] Appl. No.: 776,414
[22] PCT Filed: Jul. 8, 1995
[86] PCT No.: PCT/EP95/02665

§ 371 Date: May 1, 1997
§ 102(e) Date: May 1, 1997

[87] PCT Pub. No.: WO96/03300
PCT Pub. Date: Feb. 8, 1996

[30] Foreign Application Priority Data

Jul. 28, 1994 [DE] Germany ............ 44 26 682.0

[51] Int. Cl.$^6$ ........................................ B60T 8/42
[52] U.S. Cl. .................... 303/115.2; 303/113.4; 303/DIG. 11
[58] Field of Search ...................... 303/3, 15, 10, 303/11, 115.2, 113.4, 155, 156, DIG. 11

[56] References Cited

U.S. PATENT DOCUMENTS

| | | |
|---|---|---|
| 3,523,713 | 8/1970 | Okamoto et al. . |
| 4,812,777 | 3/1989 | Shirai . |
| 5,143,429 | 9/1992 | Higashimata et al. . |
| 5,302,008 | 4/1994 | Miyake et al. ............ 303/115.2 X |
| 5,312,172 | 5/1994 | Takeuchi ............ 303/113.4 X |
| 5,423,600 | 6/1995 | Riddiford et al. ............ 303/156 X |

FOREIGN PATENT DOCUMENTS

| | | |
|---|---|---|
| 22 08 936 | 9/1973 | Germany . |
| 23 27 508 | 12/1974 | Germany . |
| 33 42 555 | 6/1985 | Germany . |
| 34 24 912 | 1/1986 | Germany . |
| 38 03 079 | 8/1989 | Germany . |
| 40 03 579 | 6/1991 | Germany . |
| 41 02 497 | 5/1992 | Germany . |
| 42 29 041 | 3/1993 | Germany . |
| 42 20 413 | 12/1993 | Germany . |
| 42 38 333 | 5/1994 | Germany . |
| 43 01 336 | 7/1994 | Germany . |
| 43 29 139 | 7/1994 | Germany . |
| 2 100 816 | 1/1983 | United Kingdom . |

Primary Examiner—Lee W. Young
Attorney, Agent, or Firm—J. Gordon Lewis; Thomas N. Twomey

[57] ABSTRACT

The present invention relates to an electronically controllable brake actuation system for automotive vehicles, including a master brake cylinder operable by way of an actuating pedal, braking pressure generators actuatable by an electronic control unit and directly connected to the wheel brakes of the vehicle, the braking pressure generators being connectable to the master brake cylinder by way of hydraulic connections closable by valve assemblies, at least one sensor device to identify the driver's wish for deceleration, and at least one simulator chamber which interacts with the master brake cylinder.

To improve the operation of such a system, in particular the dynamics of the braking pressure generators, and to shorten the response time of the entire system in addition, the present invention proposes that the valve assemblies be configured as solenoid valves which are actuatable by the electronic control unit with time delay, and low-pressure accumulators are connected to the pressure chambers of the braking pressure generators to be connected to the wheel brakes in the release position of the braking pressure generators.

8 Claims, 2 Drawing Sheets

ELELCTRONICALLY CONTROLLABLE BRAKE ACTUATION SYSTEM

BACKGROUND OF THE INVENTION

The present invention relates to an electronically controllable brake actuation system for automotive vehicles, including a master brake cylinder operable by an actuating pedal, braking pressure generators actuatable by an electronic control unit and having pressure chambers which are connected to the wheel brakes of the vehicle, the braking pressure generators being connectable to the master brake cylinder by way of hydraulic connections closable by valve assemblies, at least one sensor device to identify the driver's wish for deceleration, and at least one simulator chamber which interacts with the master brake cylinder.

German patent application No. 34 24 912, for example, discloses a brake actuation system of this type. The hydraulic connections between the braking pressure generators and the master brake cylinder in the prior art brake actuation system are closed by bores (breathering bores) which are provided in the hydraulic cylinders of the braking pressure generators and are overridden by sealing sleeves arranged on pistons of the braking pressure generators upon actuation of the braking pressure generators.

The prior art brake actuation system is little appropriate for use in anti-lock brake systems. Thus, the closable hydraulic connections do not permit the reduction of the hydraulic pressure prevailing in the wheel brakes close to zero bar during anti-lock control operations. This is because the above-mentioned bore, to which the comparatively high pressure generated by the driver is applied, would be opened during the entire restoring movement of the braking pressure generator piston required in the control operation.

Another disadvantage with respect to anti-lock control operations must be seen in the chambers provided in the hydraulic cylinders of the braking pressure generators. The pressure fluid volume is conducted to the chambers by the driver of the vehicle to maintain the pedal feel which is normal to the driver during actuation. In any case, the drive units of the braking pressure generators must actively ensure the restoring movement of the pressure generator pistons so that high costs are incurred for a four-quadrant actuating electronics and a maximum actuating force rating is required. Further, pedal resetting occurs without damping against the driver's foot.

Finally, the direct actuation of the valve assembly provided by the combination of bore (breathering bore) and sealing sleeve is effected by the electric drive due to the mass inertias (which should not be left out of account) with a time delay. The time delay, in turn, causes inflow of a considerable pressure fluid volume so that pressure reduction to values close to zero bar is not possible. Especially control operations at low $\mu$-values are thereby impaired.

Further, German patent application No. 42 29 041 discloses an electronically controllable fail-safe brake actuation system wherein the master brake cylinder and the electrically actuatable braking pressure generators, each furnished with a separate pressure fluid supply reservoir, are connectable to the wheel brakes by way of an electromagnetically operable three-way/two-position directional control valve. In a first switch position of the three-way/two-position directional control valve, there is a hydraulic connection between the master brake cylinder or the pressure generator and the wheel brake, and the connection between the pressure generator or the master brake cylinder and the wheel brake is closed. In a second switch position, the three-way/two-position directional control valve establishes a hydraulic connection between the pressure generator or the master brake cylinder and the wheel brake, and the connection between the master brake cylinder or the pressure generator and the wheel brake is closed. When the system is intact, the driver is separated from the wheel brake and senses a firm pedal in consequence of the mentioned measures. Due to the fact that the braking pressure generators have pressure fluid supply reservoirs on their own, they must be separated from the wheel brakes upon current failure. This necessitates the use of complicated valves.

SUMMARY OF THE INVENTION

Therefore, an object of the present invention is to improve upon an electronically controllable brake actuation system of the previously mentioned type such that especially the shortcomings cited with respect to anti-lock control operations are virtually avoided. In addition, the response time shall be shortened and, simultaneously, the dynamics of actuation shall be augmented, in particular, during quick actuation.

This object is achieved by the present invention because the valve assemblies are configured as solenoid valves which are actuatable by the electronic control unit with time delay, and low-pressure accumulators are connected to the pressure chambers of the braking pressure generators to be connected to the wheel brakes in the release position of the braking pressure generators.

A compact design of the brake actuation system of the present invention which permits manufacture at low cost includes that the connection between the low-pressure accumulator and the pressure chamber of the braking pressure generator is closable by a valve assembly that is operable by the movement of the pressure generator piston, and the valve assembly is preferably configured as at least one bore in the pressure generator piston, which bore is connected to the low-pressure accumulator, terminates into the pressure chamber and interacts with a sealing sleeve spaced axially therefrom.

In a preferred aspect of the present invention, complete evacuation of the low-pressure accumulator at the end of each braking operation is achieved by the low-pressure accumulator being connected to the master brake cylinder by way of a non-return valve which opens towards the master brake cylinder.

In another preferred aspect of the present invention, wherein the braking pressure generators are configured as hydraulic cylinders having their pistons operated by electrically actuatable direct-current motors, a low-friction conversion of a rotary movement into a linear movement is achieved because the actuation is effected by a ball-and-thread drive assembly interposed between the pistons and the direct-current motor. It is appropriate that the shaft of the direct-current motor is hollow and accommodates the spindle of the ball-and-thread drive assembly. Ease of assembly of the braking pressure generators and a simple design of the spindle is achieved by these provisions. Further, the braking pressure generators have a short structure.

In still another aspect of the present invention, the spindle is properly guided by having a transverse pin, arranged vertically to the axis of the spindle, which carries a roller guided in a slot. The slot is provided in a guide tube arranged coaxially to the shaft.

In another preferred aspect of the present invention, the actuating force is transmitted from the spindle to the pressure generator piston by way of a force-transmitting member guided in the pressure generator piston. The pressure generator piston is fixed to the force-transmitting member by the intermediary of a compression spring.

Still another aspect of the present invention achieves a particularly compact design of the subject matter of the invention because the solenoid valve, the non-return valve and the low-pressure accumulator are accommodated in the housing of the hydraulic cylinder.

The present invention will be explained in detail in the following description of an embodiment, making reference to the accompanying drawings.

DETAILED DESCRIPTION OF THE INVENTION

Figure 1:
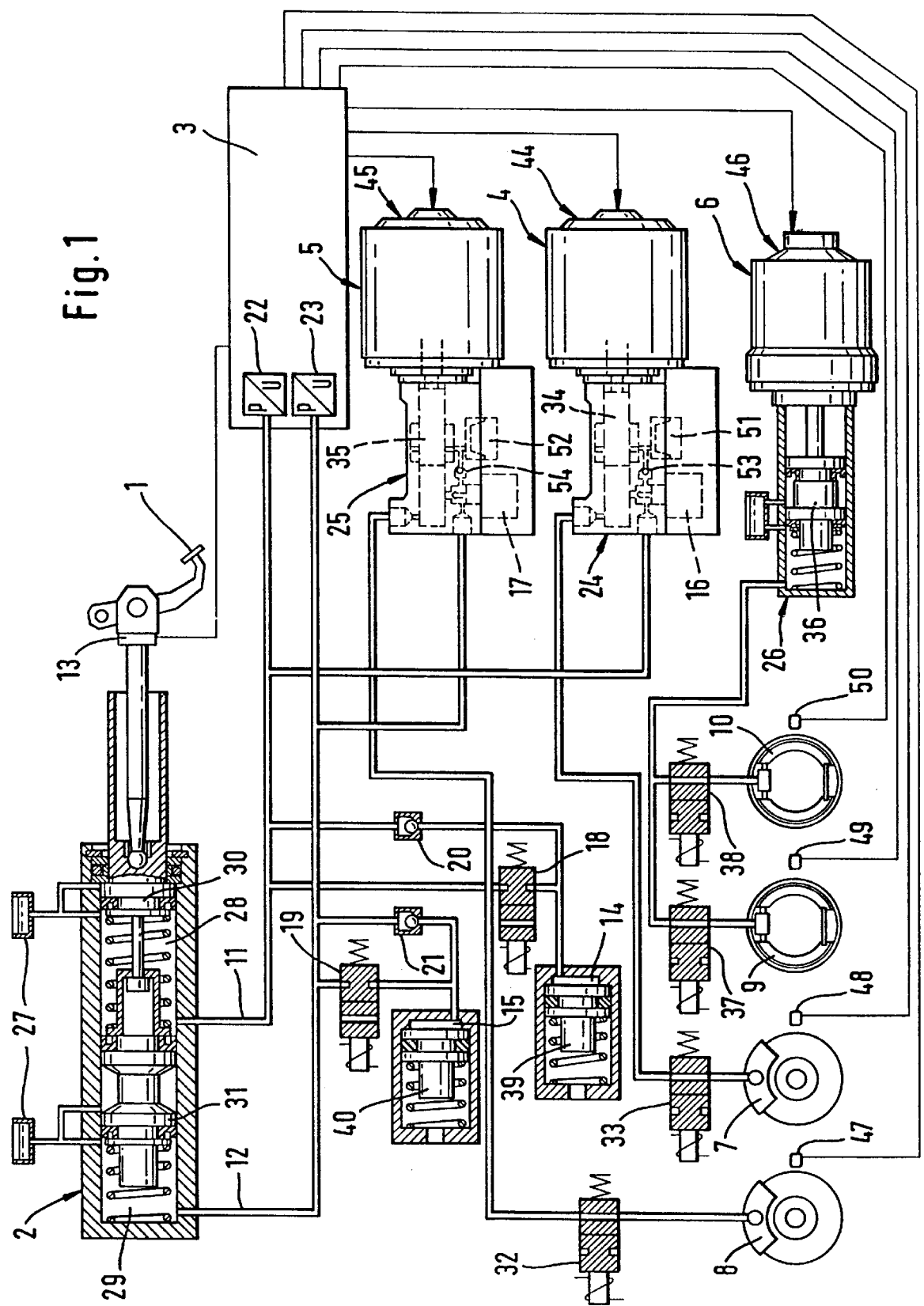
FIG. 1 is a wiring diagram of an embodiment of the brake actuation system of the present invention.

The electronically controllable brake actuation system of the present invention, as shown, is intended for use in a vehicle with front wheel drive. The system includes a dual-circuit master brake cylinder or tandem master cylinder 2 operable by an actuating pedal 1. The tandem master cylinder 2 has pressure chambers 28, 29 separated from each other and confined by two pistons 30, 31. Pressure chambers 28, 29 are connected to an unpressurized pressure fluid supply reservoir 27. The first pressure chamber (primary pressure chamber) 28 is connected to an electrically actuatable first braking pressure generator 4 by way of a closable first hydraulic line 11. A hydraulic wheel brake 7 associated with the front axle is connected to braking pressure generator 4. Line 11 is closed by way of a first solenoid valve 16. A separating valve 33, which is also electromagnetically operable, is inserted into the line portion between the first braking pressure generator 4 and the wheel brake 7. Further, a first simulator chamber 14, which is confined by a biassed piston 39, is connected to the first pressure chamber 28 by way of a parallel connection of an electromagnetically operable two-way/two-position directional control valve 18 and a non-return valve 20 opening towards the master brake cylinder 2. The second pressure chamber (secondary pressure chamber) 29 is connected to a second electrically operable braking pressure generator 5 by way of a second hydraulic line 12 which is closable by a second solenoid valve 17. The other hydraulic wheel brake 8, associated with the front axle, is connected to the braking pressure generator 5. An electromagnetically operable separating valve 32 precedes the wheel brake 8. Further, a second simulator chamber 15, confined by a biassed second piston 40, is connected to the second pressure chamber 29 by way of a parallel connection of a second electromagnetically operable two-way/two-position directional control valve 19 and a second non-return valve 21 which opens towards the master brake cylinder 2. Low-pressure accumulators 51, 52 are connected to the pressure chambers (not referred to) of the braking pressure generators 4, 5 by way of hydraulic connections which are open in the release position of the braking pressure generators 4, 5. The low-pressure accumulators 51, 52 are connected to the master brake cylinder 2, by the intermediary of non-return valves 53, 54 opening towards the master brake cylinder 2, by way of the above-mentioned hydraulic lines 11, 12. Both hydraulic wheel brakes 9, 10, which are possibly associated with the rear axle, are connected to a third braking pressure generator 6 by way of further separating valves 37, 38. Each of the three braking pressure generators 4, 5, 6 has a hydraulic cylinder 24, 25, 26, in which each one piston 34, 35, 36 is slidably guided, drivable by each one preferably reversible direct-current motor 44, 45, 46. An electronic control unit 3 is used for the joint actuation of the direct-current motors 44, 45, 46 and the solenoid valves 16, 17, 18, 19, 32, 33, 37, 38. The output signals of a brake light switch 13, interacting with the actuating pedal 1, and two pressure sensors 22, 23 are sent as input variables to the control unit 3. Pressure sensors 22, 23 are connected to the pressure chambers 28, 29 of the tandem master cylinder 2 and permit identifying the driver's wish for deceleration. In this arrangement, it is particularly favorable that the pressure sensors 22, 23 are components of the electronic control unit 3. However, other means, such as a force sensor sensing the actuating force on the actuating pedal 1, may also be used for the identification of the driver's wish for deceleration.

Further, wheel sensors 47, 48, 49, 50 are associated with the individual wheels (not shown). The sensor output signals, representative of the driving speed, are sent as further input variables to the electronic control unit 3.

Figure 2:
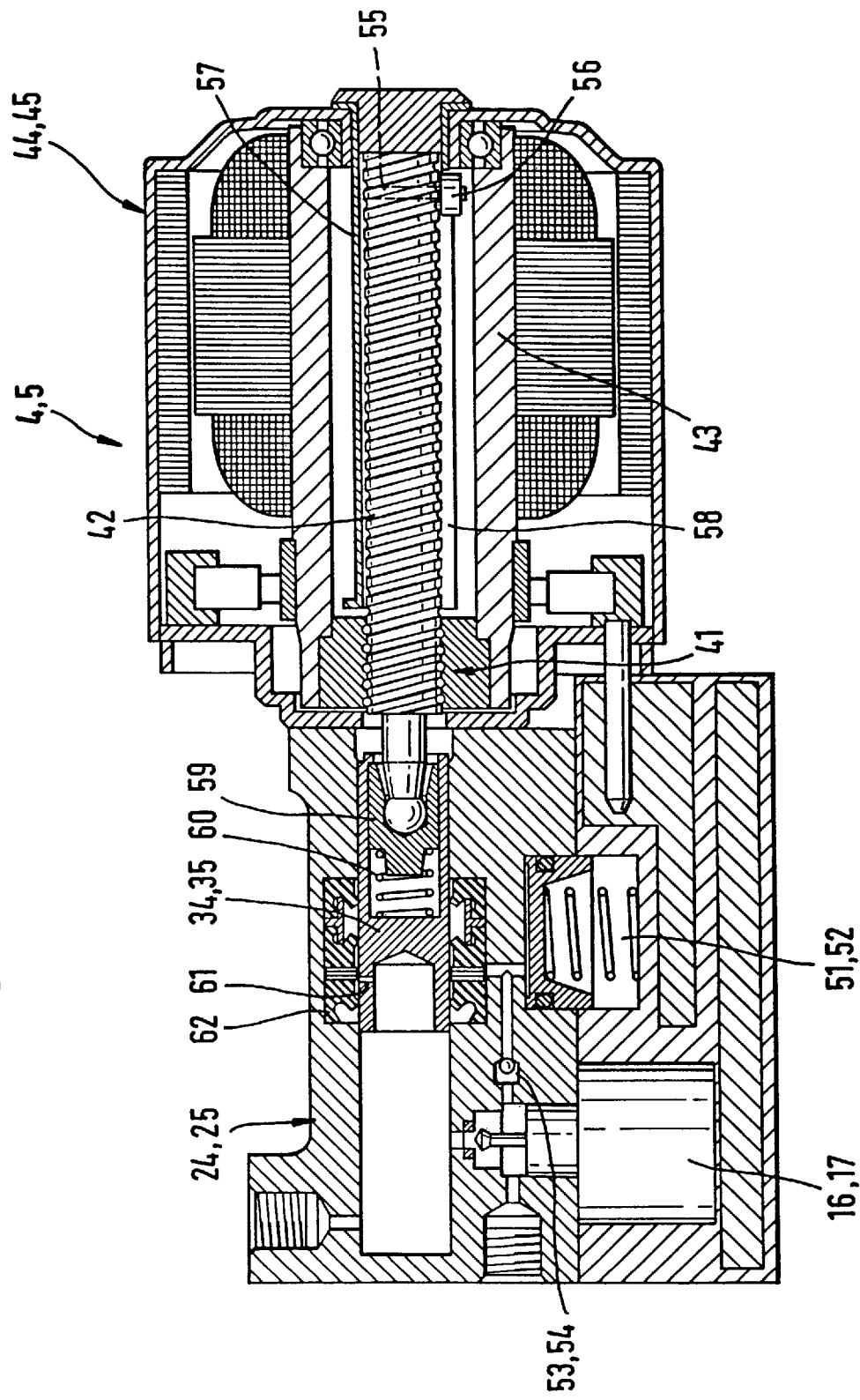
FIG. 2 is an enlarged axial cross-sectional view of a braking pressure generator of FIG. 1.

As can be seen in the embodiment of FIG. 2, in particular, the piston 34, 35 of the braking pressure generator 4, 5 is actuated by way of a ball-and-thread drive assembly or a spindle-and-nut drive assembly 41 having its spindle 42 arranged in a preferably hollow shaft 43 of the direct-current motor 44, 45, locked against rotation. The anti-rotation mechanism is carried out by way of a transverse pin 55 which is arranged in the spindle 42 vertically to the longitudinal axis of the spindle. Pin 55 carries a roller 56 which is guided in a slot 58 in a guide tube 57. Guide tube 57 is arranged coaxially relative to the shaft 43.

The actuating force generated by the electric motor 44, 45 is transmitted to the braking pressure generator piston 34, 35 preferably by way of a force-transmitting member 59 connected to the spindle 42. Member 59 is guided in the braking pressure generator piston 34, 35, and piston 34, 35 is fixed to the member 59 by the intermediary of a compression spring 60.

Further, it is especially favorable that the above-mentioned low-pressure accumulator 51, 52, the non-return valve 53, 54 and the solenoid valve 16, 17 are incorporated in the housing of the hydraulic cylinder 24, 25. The connection between the low-pressure accumulator 51, 52 and the respective pressure chamber of the master cylinder 24, 25 is closable by a valve assembly. The valve assembly includes a bore 61 in the piston 34, 35, which is connected to the low-pressure accumulator 51, 52 and terminates into the pressure chamber, and a sealing lip of a sealing sleeve 62 which is arranged at an axial distance therefrom. When the sealing lip is overridden, the connection between the bore 61 and the low-pressure accumulator 51, 52 is interrupted.

The operation of the brake actuation system shown in the embodiment of FIG. 1 in the drawing is as follows:

When a braking operation is initiated by depression of the brake actuating pedal 1, the actuating condition is identified by the brake light switch 13 and advised to the electronic control unit 3. The control signals of control unit 3 cause change-over of the valves 16, 17, 18, 19 and, thereby, separation of the master cylinder pressure chambers 28, 29 from the braking pressure generators 4, 5 and their connection to the simulator chambers 14, 15. Change-over of the solenoid valves 16, 17 is preferably effected with a predefinable time delay so that hydraulic pressure can be built up very quickly in the brakes 7, 8, especially during a quick actuation. The driver's wish for deceleration is signalled a second time by the pressure sensors 22 and 23 to the electronic control unit 3 which calculates the desired brake torques on the vehicle axles by way of the brake force distribution system installed in control unit 3. The control signals representative of the calculated brake torques are sent to the direct-current motors 44, 45, 46 of the braking pressure generators 4, 5, 6 which initiate displacement of the braking pressure generator pistons 34, 35, 36 in the actuating direction and, thus, pressure increase in the wheel brakes 7 to 10. The usual pedal feel which can be sensed by the driver during a braking operation is ensured by the connection between the master brake cylinder 2 and the simulator chambers 14, 15 now being open. The separating or multiplex valves 32, 33, 37, 38 inserted in the line portions which lead to the wheel brakes 7 to 10 remain open.

The pressure is reduced by return movement of the pistons 34, 35, 36, possibly by an active reversal of the direction of rotation of the direct-current motors 44, 45, 46. The additional volume of pressure fluid introduced by the driver into the wheel brakes 7, 8 is stored in the low-pressure accumulators 51, 52 in particular in the pressure reduction period of an anti-lock control operation. At the end of the braking operation, the accumulators 51, 52 are evacuated into the pressure fluid supply reservoir 27 by way of the non-return valves 53, 54 and the pressure chambers 28, 29 of the master brake cylinder 2.

An augmented dynamics of the braking operation is achieved by the above-mentioned provisions. A period in which the pressure is maintained constant is realized by change-over of the separating or multiplex valves 32, 33, 37, 38 into their closed position.

Thus, an anti-lock control operation is performed in a three-channel fashion (front axle—two channels, rear axle—one channel) in the control mode by the wheel speed sensors 47, 48, 49, 50, and the braking pressure modulation on the rear axle may be effected according to the "select-low" principle, for example.

The separating valves are driven in the multiplex mode in a traction slip control operation or a driving stability control operation. This obviates the need for a fourth braking pressure generator.

All valves will become de-energized upon failure of the electronic system/vehicle electrical system. In this event, both wheel brakes 7, 8 associated with the front axle are connected to the tandem master cylinder 2 by way of the normally open valves 16, 17 so that the stipulations mandated by law to counteract failure of the electronic system are satisfied.

Upon hydraulic malfunction of the brake circuits associated with the front axle, the circuit associated with the rear axle will always permit achieving the "brake-by-wire" braking effect mandated by law. Upon failure of the hydraulic circuit associated with the rear axle, the use of the brake light switch 13 and the pressure sensors 22, 23 ensures that the "brake-by-wire" braking effect is achieved by way of the driven front axle.

We claim:

1. An electronically controllable brake actuation system for automotive vehicles, including a master brake cylinder operable by an actuating pedal, braking pressure generators actuatable by an electronic control unit and having pressure chambers which are connected to the wheel brakes of the vehicle, the braking pressure generators being connectable to the master brake cylinder by way of hydraulic connections closable by valve assemblies, at least one sensor device to identify the driver's wish for deceleration, and at least one simulator chamber which interacts with the master brake cylinder, characterized in that the valve assemblies are configured as solenoid valves which are actuatable by the electronic control unit with time delay after identification of the driver's wish for deceleration, and low-pressure accumulators are connected to the pressure chambers of the braking pressure generators to be connected to the wheel brakes in the release position of the braking pressure generators.

2. The electronically controllable brake actuation system as claimed in claim 1, characterized in that the connection between the low-pressure accumulator and the pressure chamber of the braking pressure generator is closable by a valve assembly that is operable by the movement of the pressure generator piston.

3. The electronically controllable brake actuation system as claimed in claim 2, characterized in that the valve assembly is configured as at least one bore in the pressure generator piston, which bore is connected to the low-pressure accumulator, terminates into the pressure chamber and interacts with a sealing sleeve spaced axially therefrom.

4. The electronically controllable brake actuation system as claimed in claim 1, characterized in that the low-pressure accumulator is connected to the master brake cylinder by way of a non-return valve which opens towards the master brake cylinder.

5. The electronically controllable brake actuation system as claimed in claim 1, wherein the braking pressure generators are configured as hydraulic cylinders having pistons operated by way of electrically actuatable direct-current motors, characterized in that the actuation is effected by a ball-and-thread drive assembly interposed between the pistons and the direct-current motor, and the shaft of the direct-current motor is hollow and accommodates a spindle of the ball-and-thread drive assembly.

6. The electronically controllable brake actuation system as claimed in claim 5, characterized in that the spindle includes a transverse pin, arranged vertically to the axis of the spindle, which carries a roller guided in a slot in a guide tube that is arranged coaxially to the shaft.

7. The electronically controllable brake actuation system as claimed in claim 5, characterized in that the actuating force is transmitted from the spindle to the pressure generator piston by way of a force-transmitting member guided in the pressure generator piston, the pressure generator piston being fixed to the force-transmitting member by the intermediary of a compression spring.

8. The electronically controllable brake actuation system as claimed in claim 5, characterized in that the solenoid valve, a non-return valve and the low-pressure accumulator are accommodated in a housing of the hydraulic cylinder.

* * * * *